United States Patent
Yi et al.

(10) Patent No.: US 7,992,537 B2
(45) Date of Patent: Aug. 9, 2011

(54) APPROACH FOR IMPROVED FUEL VAPORIZATION IN A DIRECTLY INJECTED INTERNAL COMBUSTION ENGINE

(75) Inventors: Jianwen James Yi, Canton, MI (US); Claudia Olivia Iyer, Canton, MI (US); FooChern Ting, Redford, MI (US); George Carver Davis, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 942 days.

(21) Appl. No.: 11/867,095

(22) Filed: Oct. 4, 2007

(65) Prior Publication Data
US 2009/0093950 A1 Apr. 9, 2009

(51) Int. Cl.
*F02B 17/00* (2006.01)
*F02B 31/00* (2006.01)
(52) U.S. Cl. .......................... 123/295; 123/298; 123/575
(58) Field of Classification Search .................. 123/295, 123/298, 430, 90.15–90.17, 345–348, 478, 123/305, 575; 701/105
See application file for complete search history.

(56) References Cited

U.S. PATENT DOCUMENTS

| | | | | |
|---|---|---|---|---|
| 5,062,395 | A | * | 11/1991 | Tateno ..................... 123/65 VD |
| 6,062,201 | A | * | 5/2000 | Nozawa et al. ............... 123/478 |
| 6,681,741 | B2 | * | 1/2004 | Majima et al. ................ 123/399 |
| 6,761,147 | B2 | | 7/2004 | Majima |
| 6,837,040 | B2 | | 1/2005 | Sonoda et al. |
| 7,117,830 | B1 | * | 10/2006 | Boyer et al. ............... 123/90.15 |
| 2006/0168944 | A1 | | 8/2006 | Inoue et al. |

FOREIGN PATENT DOCUMENTS

JP 11324778 11/1999
WO 2005083249 9/2005

* cited by examiner

*Primary Examiner* — Mahmoud Gimie
(74) *Attorney, Agent, or Firm* — Allan J. Lippa; Alleman Hall McCoy Russell & Tuttle LLP

(57) ABSTRACT

A system and a method of facilitating fuel vaporization in a directly injected internal combustion engine are provided. As one example, vaporization may be improved by coordinating the timing of the directly injected fuel with intake valve opening while also utilizing negative valve overlap between the intake and exhaust valves to generate reduced pressures within the cylinder.

20 Claims, 6 Drawing Sheets

APPROACH FOR IMPROVED FUEL VAPORIZATION IN A DIRECTLY INJECTED INTERNAL COMBUSTION ENGINE

BACKGROUND AND SUMMARY

The inventors of the present disclosure have recognized that emissions produced by an engine shortly after start-up can constitute a large portion of the entire drive cycle emissions. Engines utilizing direct in-cylinder injectors can experience even greater emissions due to reduced fuel vaporization and atomization under certain conditions. For example, after start-up of the engine, the fuel system pressure may not yet have attained a pressure to cause sufficient atomization of the fuel within the combustion chamber, which may result in increased emissions. Furthermore, lower engine temperatures after start-up can further reduce the vaporization rate of the directly injected fuel. As yet another example, vaporization rate can vary with fuel composition. For example, blended fuels containing gasoline and alcohol may have lower vaporization rates than fuels containing only gasoline or lower concentrations of alcohol.

As one approach, at least some of the above issues may be addressed by a method, whereby in a cylinder of a directly injected internal combustion engine, the method comprises: closing an exhaust valve of the cylinder; opening an intake valve after the exhaust valve has closed; moving a piston of the cylinder away from top dead center between the closing of the exhaust valve and the opening of the intake valve to expand the cylinder volume and reduce a pressure within the cylinder to below a pressure of an air intake manifold of the cylinder; and initiating an injection of fuel directly into the cylinder via a direct in-cylinder injector after the exhaust valve has closed. In some examples, the inventors have identified that vaporization of the fuel may be further improved if the fuel injection is initiated at substantially the same timing as the intake valve opening or after the intake valve opening.

In this way, fuel vaporization may be improved by coordinating the timing of the directly injected fuel with intake valve opening while also utilizing negative valve overlap between the intake and exhaust valves to generate reduced pressures within the cylinder. These reduced cylinder pressures can improve the vaporization rate of the directly injected fuel since the boiling temperature of the fuel is reduced at lower cylinder pressures. Furthermore, the rate of air entrainment into the cylinder at intake valve opening can be increased by reducing the pressure within the cylinder to below the pressure of the intake manifold, thereby improving mixing of the entrained air and with the directly injected fuel which can further increase the fuel vaporization rate. Thus, emissions produced after engine start-up can be reduced by improving fuel vaporization as described herein.

DETAILED DESCRIPTION

Figure 1:
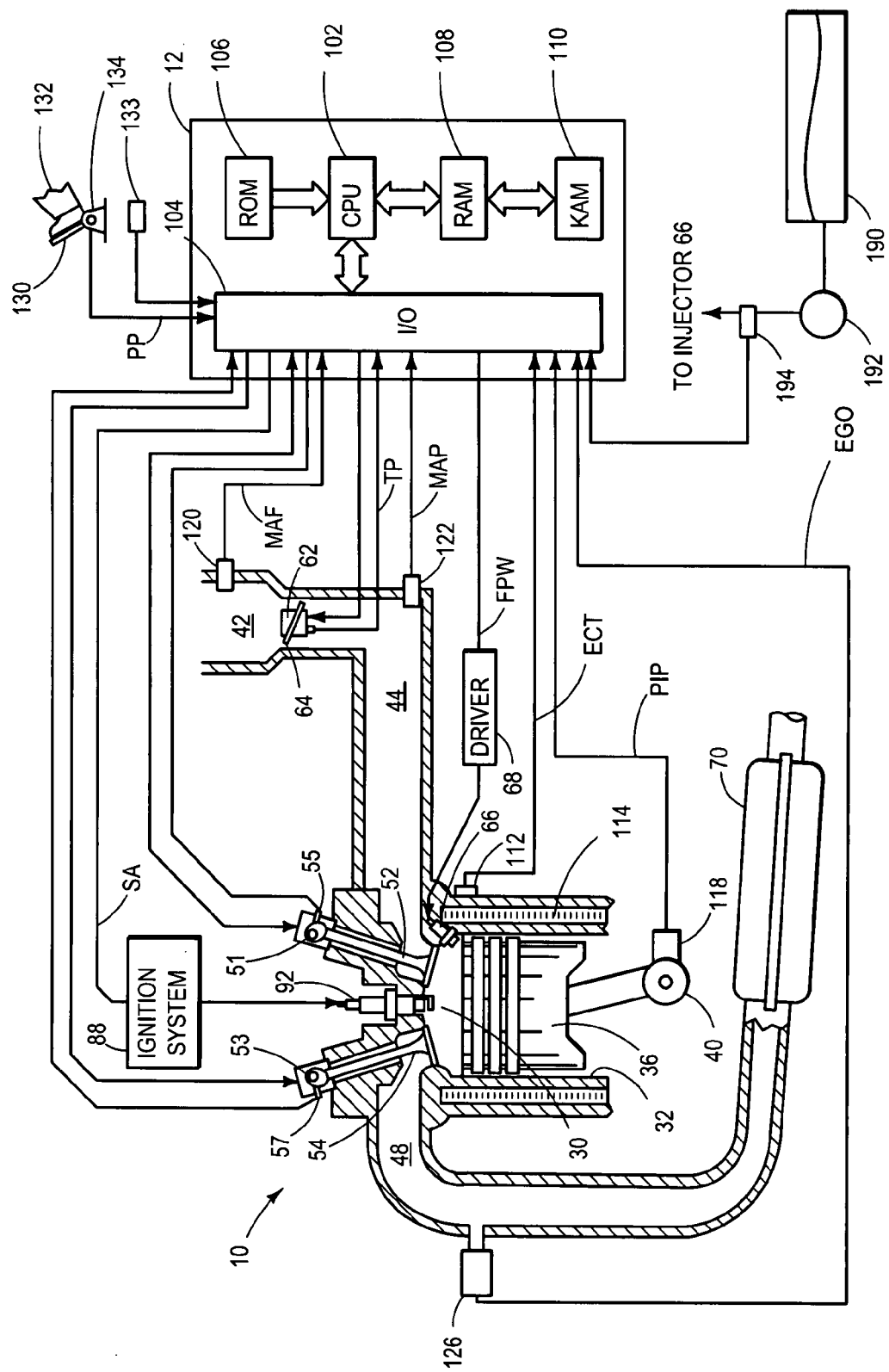
FIG. 1 shows a schematic depiction of an example cylinder of an internal combustion engine including an in-cylinder direct fuel injector.

FIG. 1 shows a schematic depiction of an example cylinder 30 of an internal combustion engine 10 including an in-cylinder direct fuel injector 66. As one example, engine 10 can be configured as gasoline engine or a flexible fuel engine for a vehicle. For example, engine 10 can be configured to operate with a fuel including a mixture of gasoline and alcohol. Engine 10 may include multiple cylinders, one of which is shown in FIG. 1. It should be appreciated that each cylinder may similarly include its own set of intake/exhaust valves, fuel injector, spark plug, etc.

Engine 10 may be controlled by a control system including a controller 12. The engine control system including controller 12 can receive user input from a vehicle operator 132 via one or more user input devices. As one example, user 132 can utilize an accelerator pedal 130 to provide an input to the controller indicative of operator torque or speed request as identified by pedal position sensor 134. Further, the vehicle operator can start the engine via an ignition switch indicated at 133.

Combustion chamber 30 of engine 10 may include combustion chamber walls 32 with piston 36 positioned therein. Piston 36 can move between a top dead center (TDC) position providing the smallest cylinder volume and a bottom dead center (BDC) position providing the greatest cylinder volume. Piston 36 may be coupled to crankshaft 40, which can in turn be coupled to a drive wheel of a vehicle via an intermediate transmission system. Crankshaft 40 may be coupled with other pistons of the engine arranged in other engine cylinders. Further, a starter motor may be coupled to crankshaft 40 to assist in cranking engine 10 during start-up.

Combustion chamber 30 can receive intake air from intake passage 42 via intake manifold 44 and may exhaust combustion gases via exhaust manifold 48. Intake manifold 44 and exhaust manifold 48 can selectively communicate with combustion chamber 30 via respective intake valve 52 and exhaust valve 54. In some embodiments, combustion chamber 30 may include two or more intake valves and/or two or more exhaust valves. Intake manifold 44 and exhaust manifold 48 can also communicate with other cylinders of the engine.

In the particular example shown in FIG. 1, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), and/or variable valve lift (VVL) systems to vary valve operation. For example, one or more of these systems can be used to vary the valve timing and valve lift by transitioning between cams having different lift profiles, and/or by varying the relative positional relationship between the cams and the piston and/or crankshaft. For example, the intake valve timing can be advanced by advancing the rotational position of the intake cam relative to the crankshaft which is coupled with the piston and can retard the intake valve timing by retarding the rotational position of the intake cam relative to the crankshaft. The position of intake valve 52 and exhaust valve 54 may be determined by position sensors 55 and 57, respectively, to enable valve control feedback at the controller. In alternative embodiments, intake valve 52 and/or exhaust valve 54 may be controlled by electromagnetic valve actuation (EVA). For example, cylinder 30 may alternatively include an intake valve controlled via electric valve actuation and an exhaust valve controlled via cam actuation including CPS and/or VCT systems. As another example, cylinder 30 may alternatively include EVA for intake and exhaust valves. Regardless of the particular configuration of the valve actuators, it should be appreciated that the control system can be configured to vary the timing and/or lift of the intake and/or exhaust valves to enable the various approaches described herein.

In this example, fuel injector 66 is configured as an in-cylinder direct injector and is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The in-cylinder direct fuel injector may be mounted in the side of the combustion chamber or in the top of the combustion chamber, for example. Fuel may be delivered to fuel injector 66 by a fuel system including a fuel tank 190 and a fuel pump 192 via a fuel rail. A fuel pressure sensor 194 can provide an indication of fuel system pressure to controller 12. In some examples, combustion chamber 30 may additionally include a port fuel injector arranged in intake passage 44 in a configuration that provides what is known as port injection of fuel into the intake port upstream of combustion chamber 30.

Intake passage 42 may include a throttle 62 having a throttle plate 64. In this particular example, the position of throttle plate 64 may be varied by controller 12 via a signal provided to an electric motor or actuator of throttle 62, a configuration that may be referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 and/or intake manifold 44 may include a mass air flow sensor 120 and a manifold air pressure and/or temperature sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some examples, combustion chamber 30 or one or more other combustion chambers of engine 10 may be operated in a compression ignition mode, with or without an ignition spark.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 48 downstream of exhaust gas sensor 126. Device 70 may be a three way catalyst (TWC), NOx trap, various other emission control devices, or combinations thereof.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

In some examples, the control system can identify the composition of the fuel contained within the fuel system or provided to the cylinder via the injector. As one example, the control system can use air/fuel feedback from an exhaust gas sensor (e.g. sensor 126) to identify the fuel octane or the relative amounts of alcohol and gasoline contained in the fuel. As another example, a fuel composition sensor may be provided with the fuel system for indicating a concentration of a fuel component in the fuel. For example, an alcohol sensor may be provided to identify alcohol concentration in a gasoline and alcohol fuel blend.

During some conditions, such as after the engine is started and before the engine is warmed-up, fuel vaporization and atomization may be less complete for fuel injections that are performed via an in-cylinder direct injector, such as injector 66, for example. Fuel vaporization may be further reduced for directly injected engines during start-up due to lower fuel system pressures and/or cooler engine temperatures before the engine is sufficiently heated. For example, during a first number of injection events or cycles after start-up of the engine, the fuel system pressure may not have yet attained its fuel pressure setpoint and/or cooler engine temperatures can impart less thermal energy to the fuel, each of which can reduce fuel vaporization.

Furthermore, fuel vaporization and atomization can vary with different fuel blends or fuel compositions. For example, vaporization of fuels containing higher concentrations of alcohol such as methanol and ethanol can be lower than fuels containing lower concentrations of alcohol. Thus, vaporization issues may be exacerbated with fuel blends containing greater concentrations of alcohol.

The reduced fuel vaporization of the fuel can thereby cause reduced mixing of the fuel with the cylinder air charge, which can cause increased production of exhaust gas emissions and/or reduced combustion efficiency. Additionally, lower vaporization rates can cause fuel droplets to coat the cylinder walls and piston surface, which may result in incomplete combustion.

Figure 2:
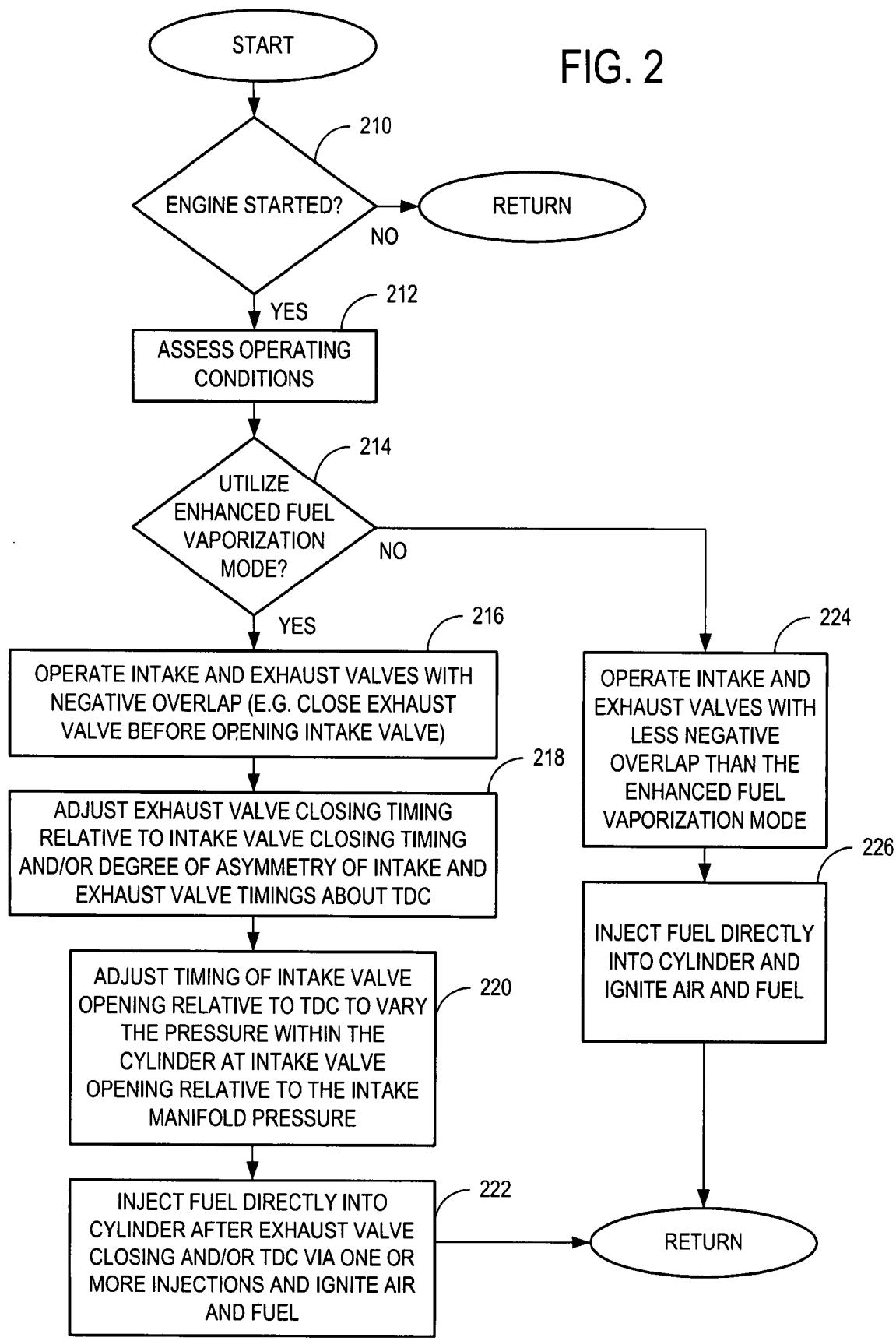
FIG. 2 is a flow chart depicting an example approach for selecting and performing a fuel vaporization mode.

FIG. 2 is a flow chart depicting an example approach for controlling a directly injected internal combustion engine as shown in FIG. 1, for example. In particular, the approaches described with reference to FIG. 2 can be used to address some of the issues with fuel vaporization in a directly injected engine.

At 210, it may be judged whether the engine has been started. As one example, the control system can receive a request from the vehicle operator to start the engine via ignition switch 133. As another example, the control system may be configured to start the engine from a deactivated state without necessarily requiring input from the vehicle operator. For example, during conditions where the engine is deactivated in order to conserve fuel such as at idle, during a deceleration fuel shut off (DFSO) operation, or where the engine is configured in a hybrid propulsion system whereby a secondary traction motor is instead used to propel the vehicle.

If the engine has not been started, then the routine may return. Alternatively, if the engine has been started, then engine operating conditions may be assessed at 212. As one example, the control system may assess various operating conditions of the engine via one or more sensors described with reference to FIG. 1 among other sensors that would be appreciated by one of ordinary skill in the art in light of the present disclosure. For example, the control system can identify ambient air temperature, the temperature of the engine (e.g. via sensor 112), the temperature of the intake air within one of intake passages 42 and 44, the fuel temperature within the fuel system prior to injection, the fuel system pressure, the fuel composition (e.g. proportion of a component such as an alcohol in a gasoline and alcohol fuel mixture), the temperature of an exhaust aftertreatment device such as catalyst 70, the composition of the exhaust gases, the period of time after the engine is started, and/or the number of engine cycles that have transpired after the engine has started, among other operating conditions.

At 214, it may be judged whether to utilize an enhanced fuel vaporization mode. As one example, the control system judges whether to utilize the enhanced fuel vaporization mode responsive to the operating conditions assessed at 212. For example, the control system may utilize the enhanced vaporization mode when the temperature of the engine is below a threshold, the temperature of the fuel in the fuel system is below a threshold, the fuel pressure provided by the fuel system is below a threshold, the temperature of the intake air is below a threshold, the fuel composition includes a threshold fractional amount of a particular component such as alcohol, and/or before a prescribed period of time or number of engine cycles have commenced after the engine has started, among other conditions where additional fuel vaporization is appropriate.

Figure 7A:
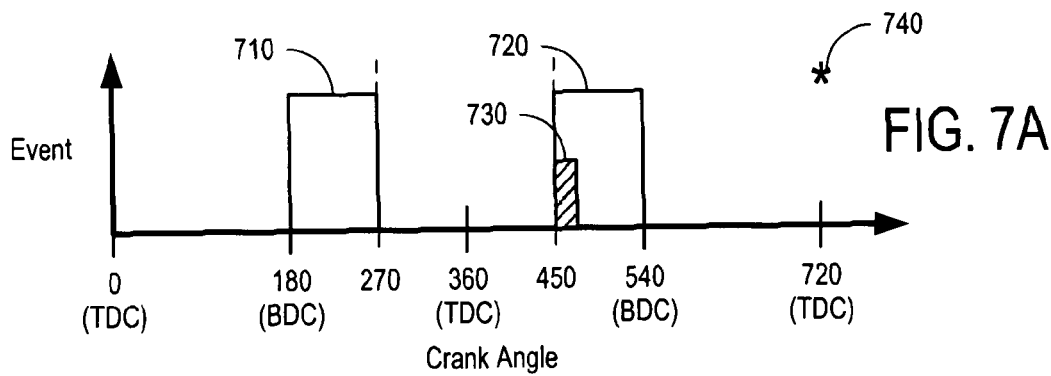
FIGS. 7A-7D are timing diagrams showing engine control examples.
Figure 7B:
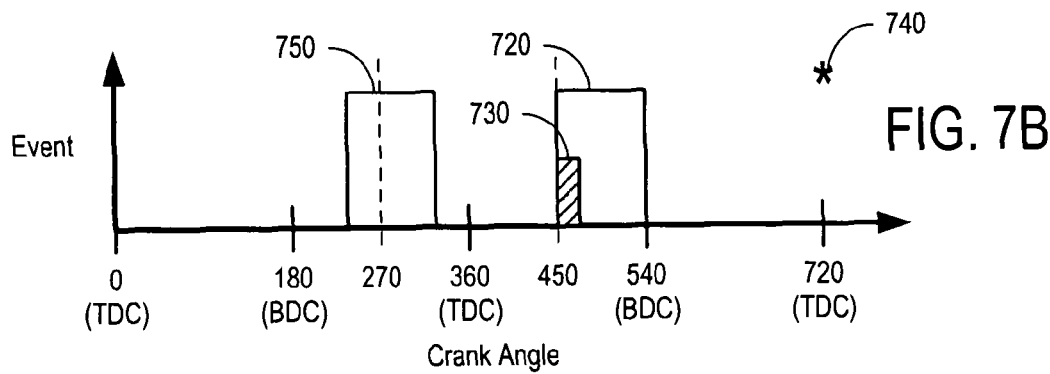
Figure 7C:
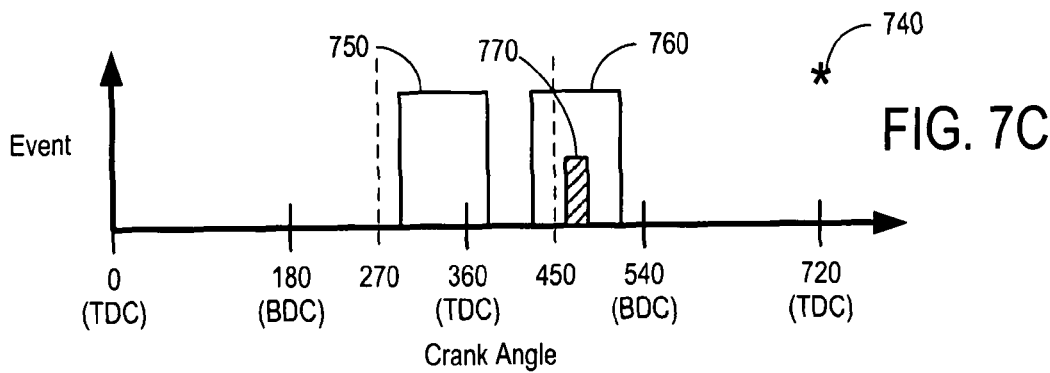

If the enhanced fuel vaporization mode is to be utilized, then at 216, the intake and exhaust valves may be operated with negative valve overlap, whereby the exhaust valve is closed before the intake valve is opened as shown in each of FIGS. 7A-7B, for example. Note that the exhaust valve can be closed before the piston reaches TDC as shown in FIG. 7A or can be closed after TDC as shown in FIG. 7C. Thus, the intake valve during the enhanced vaporization mode is opened after the exhaust valve is closed and can be opened after TDC.

At 218, the amount of negative overlap (e.g. the timing or crank angle degrees) between the exhaust valve closing and intake valve opening can be adjusted and/or the degree of asymmetry between the timing of the exhaust valve closing and intake valve opening relative to TDC can be varied to achieve different pressures inside the cylinder at the time when the intake valve is opened. These parameters can be varied responsive to the various operating conditions assessed at 212. For example, the extent of the negative overlap between the intake and exhaust valves can be adjusted responsive to fuel system pressure, fuel composition, engine temperature, etc. Similarly, the timing between the exhaust valve closing and TDC and the timing between the intake valve opening and TDC (e.g. the extent of the asymmetry in valve timings about TDC) can be varied responsive to the operating conditions assessed at 212. For example, the engine may be operated with a different amount of negative valve overlap or a different level of valve timing symmetry about TDC for different fuel compositions (e.g. relative amounts of alcohol and gasoline contained in the fuel).

For example, the exhaust valve can be closed at first timing (e.g. number of crank angle degrees) relative to TDC and the intake valve can be opened at a second timing relative to TDC. As shown in FIG. 7A, these first and second timings can be the same. In other words, the exhaust valve can be closed at a timing that is symmetric about TDC with the intake valve opening. As another example shown in FIG. 7B, the first timing can be smaller than the second timing so that the exhaust valve is closed closer to TDC than timing at which the intake valve is opened. This asymmetry in timing between exhaust valve closing and intake valve opening can be used to further reduce the pressure within the cylinder as the piston moves away from TDC. In this way, pressure within the cylinder at the time of intake valve opening can be varied by the control system by adjusting the timing of exhaust valve closing and intake valve opening relative to each other.

Figure 7D:
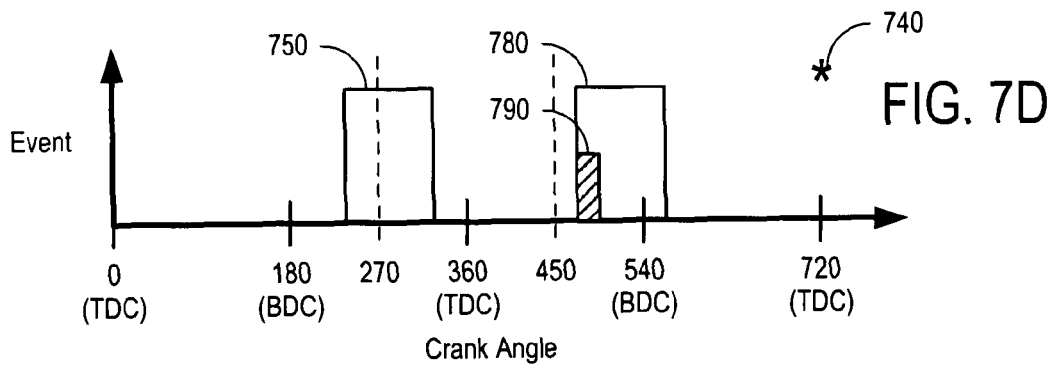

At 220, the timing at which the intake valve is opened relative to TDC can be used to vary the pressure within the cylinder at intake valve opening. For example, for a given exhaust valve timing, the intake valve opening can be retarded (i.e. delayed) to further reduce the pressure within the cylinder or can be advanced to reduce the extent of the pressure drop within the cylinder as the piston moves away from TDC. FIGS. 7B-7D show examples where the intake valve openings can be provided at different timings relative to TDC. The timing of the intake valve opening relative to TDC can also be varied responsive to the operating conditions assessed at 212, including fuel composition, engine temperature, and fuel system pressure, among others.

With each of the operations 218 and 220, the pressure within the cylinder when the intake valve is opened can be controlled to facilitate vaporization of the fuel. As one example, the pressure within the cylinder can be reduced to below the pressure in the intake manifold of the engine. As described herein with reference to FIG. 3, the boiling temperature of the fuel can decrease with a decrease in pressure and a lower boiling temperature for the fuel can increase fuel vaporization rate. Thus, by injecting the fuel into a lower pressure cylinder, the fuel can vaporize more rapidly. Furthermore, as described with reference to FIGS. 4 and 5, the pressure within the cylinder can be reduced so that when the intake valve is opened, the influx of intake air from the intake manifold can further facilitate vaporization of the fuel by increasing the air and fuel mixing rate. Thus, in at least some examples, the fuel vaporization rate can be increased by reducing the pressure within the cylinder when the intake valve is opened and/or the fuel is injected.

Figure 5:
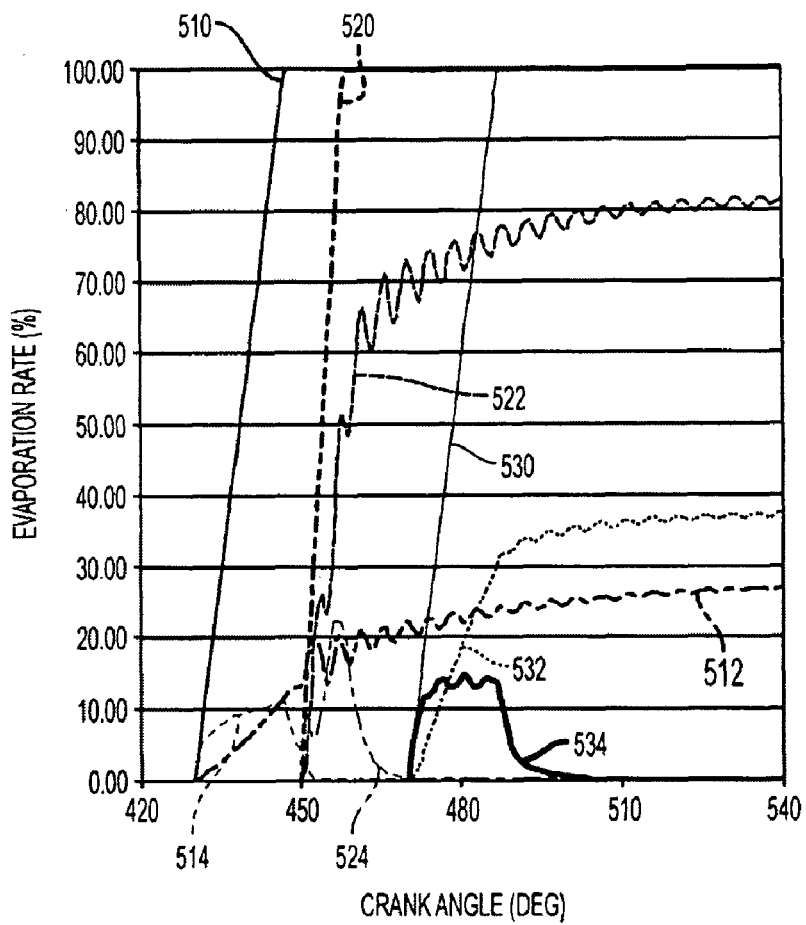
FIG. 5 is a graph showing an effect of varying the start of injection on fuel evaporation rate.

At 222, one or more fuel injections can be initiated, whereby the direct in-cylinder injector provides fuel to the combustion chamber and the mixture of air and fuel that are formed within the combustion chamber can be ignited via an ignition spark. However, in other examples, the air and fuel mixture can be ignited by compression ignition without necessarily requiring an ignition spark. The fuel injection can be performed after the exhaust valve closing and after TDC as shown in FIG. 5 and FIGS. 7A-7D, for example. Further, as shown in FIG. 5, the fuel injection can be initiated before the intake valve opening, at substantially the same time as the intake valve opening as shown in FIGS. 5 and 7B, and/or after the intake valve opening as shown in FIGS. 5 and 7C. Further, as shown in FIG. 8C, the control system can initiate a plurality of fuel injections around the valve opening.

As one non-limiting example, the control system can utilize feedback from an exhaust gas sensor to assess whether fuel vaporization is sufficient for a given fuel injection and in response to this feedback, the control system can vary the exhaust valve timing, intake valve timing, and/or fuel injection timing and/or fuel injection amount accordingly. As the fuel is ignited, the routine can return, for example, to 210 for a subsequent cycle of the cylinder. Further, it should be appreciated that the routine of FIG. 2 can be applied to other cylinders of the engine.

Figure 4:
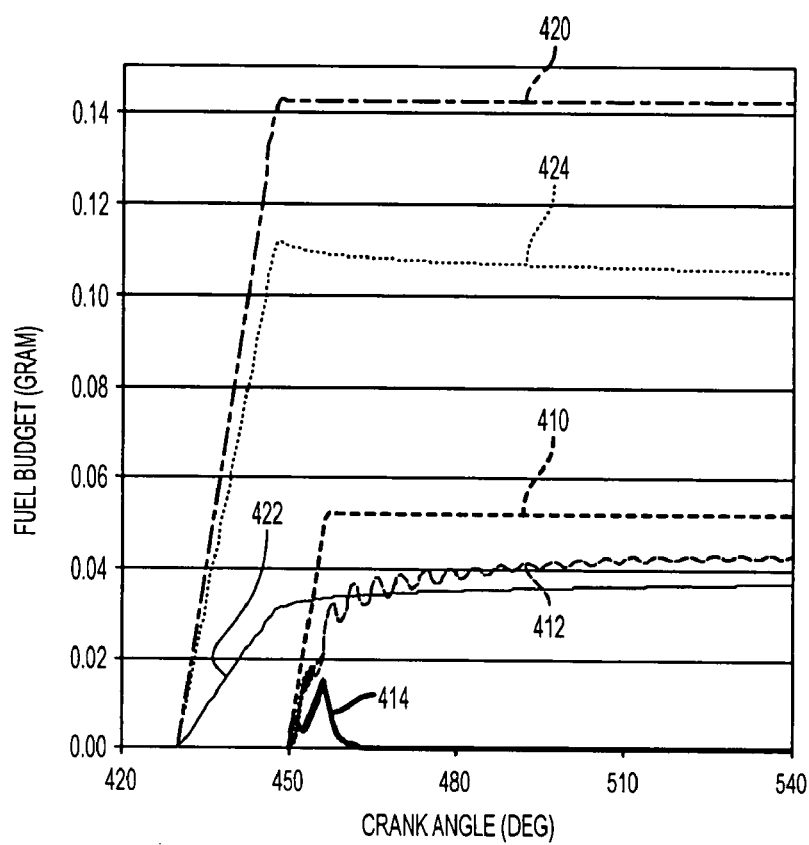
FIG. 4 is a graph showing a comparison of fuel evaporation rate within the a cylinder of the engine for different valve control approaches.

As will be described in greater detail with reference to FIGS. 5 and 6, the inventors herein have recognized that injecting the fuel at substantially the same time as intake valve opening or within a particular period after intake valve opening can provide increased fuel vaporization. For example, the graph of FIG. 4 illustrates how fuel vaporization can be substantially improved by initiating an injection of fuel into the cylinder having a reduced pressure at the same time the intake valve is opened.

If at 214, it is judged not to utilize the enhanced fuel vaporization mode, then the routine may proceed to 224. For example, the control system may not utilize the enhanced fuel vaporization mode when the temperature of the engine is above a threshold, when the temperature of the fuel is above a threshold, when the fuel pressure provided by the fuel system is above a threshold, when the temperature of the intake air is above a threshold, the fuel composition includes less than a threshold alcohol fraction, and/or after a prescribed period of time or number of engine cycles have commenced after the engine has started. Further, the control system can utilize feedback from an exhaust gas sensor to identify whether fuel vaporization is sufficient without utilizing the enhanced vaporization described with reference to the operations of 216-222.

Figure 3:
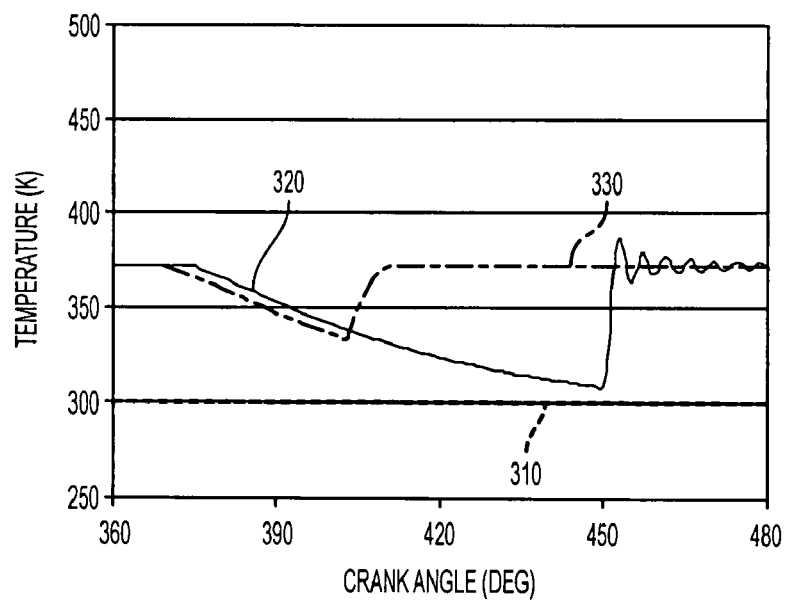
FIG. 3 is a graph showing a comparison between fuel boiling temperatures within a cylinder of the engine for different valve control approaches.

At 224, the intake and exhaust valves for the un-enhanced vaporization mode can be operated with less negative overlap than the enhanced fuel vaporization mode. For example, the intake and exhaust valves can be operated with positive overlap as shown in FIG. 8B or with less overlap than applied at 216. FIG. 3 described in greater detail below, shows a comparison between the enhanced fuel vaporization mode and the un-enhanced vaporization mode for a particular set of operating conditions after a cold start, whereby the intake and exhaust valves are operated with a greater negative overlap during the enhanced vaporization mode to enable a greater reduction in the boiling temperature of the fuel, which can further promote fuel vaporization. For example, the intake valve can be opened after 60 degrees after TDC during the enhanced vaporization mode, while the intake valve can be opened before 60 degrees after TDC during where enhanced vaporization of the fuel is not requested.

Further, as indicated at 226, the intake and exhaust valves may be operated at timings that are more symmetric about TDC than with the enhanced fuel vaporization mode, an example of which is shown in FIG. 8B. Finally, at 228, fuel may be injected into the cylinder after TDC via one or more injections and the fuel may be ignited, for example, via an ignition spark. Note that one or more of the following fuel injection parameters may differ between the operations of 228 and 222 such as the amount of fuel injected, the timing at which the fuel injections are initiated, and the number of the fuel injections performed during the cycle. From 228, the routine may return to provide control for subsequent cycles or other cylinders of the engine.

FIG. 3 is a graph showing a comparison between fuel boiling temperature within an example cylinder of the engine for the enhanced and un-enhanced vaporization modes shortly after a cold start of the engine. The graph of FIG. 3 shows crank angle represented along the horizontal axis and temperature represented along the vertical axis. As indicated at 310, the temperature of the fuel for each mode in this example is a constant 300 degrees Kelvin. However, it should be appreciated that the approaches described herein can work with other fuel temperatures or fuel temperatures that vary with time after start-up of the engine. The increased negative valve overlap of the enhanced vaporization mode can be used to provide a greater reduction in the boiling temperature of the fuel as indicated at 320 in comparison to the higher boiling temperature of the fuel for the un-enhanced vaporization mode indicated at 330. For example, as shown in FIG. 3, the boiling temperature of the fuel during the enhanced vaporization mode indicated at 320 can be reduced to near the temperature of the fuel within the fuel system.

One cause of the greater reduction in boiling temperature of the fuel is the lower pressure that is achieved within the cylinder due to the increased negative valve overlap utilized by the enhanced vaporization mode. Furthermore, asymmetry in the closing of the exhaust valve and opening of the intake valve about TDC of the piston position can be used to further reduce the pressure within the cylinder as the piston is drawn away from TDC, thereby further reducing the boiling temperature of the fuel. For example, the exhaust valve can be closed closer to TDC than the opening of the intake valve as shown in FIG. 7B. Thus, as described with reference to the routine of FIG. 2, the control system can adjust the boiling temperature of the fuel within the cylinder by varying the cylinder pressure via negative valve overlap and asymmetric operation of the intake and exhaust valves about TDC, thereby controlling the vaporization rate of the fuel.

With the fuel temperature of 300 K, the fuel boiling temperature when utilizing the enhanced vaporization mode during engine warm-up is very close to the fuel droplet temperature around the crank angle of 45° crank angle degrees, which is the intake valve opening time in this example. Thus, in each of the examples indicated at 320 and 330, the boiling temperature of the fuel dramatically increases as the intake valve is opened and the pressure within the cylinder increases due to the influx of air as it is equalized with the pressure of the intake manifold.

Further, FIG. 3 also shows how the intake valve during the enhanced vaporization mode can be opened later than the intake valve during the non-enhanced vaporization mode. The intake valve during the enhanced vaporization mode in this particular example is opened at approximately 450 crank angle degrees or approximately 90 crank angle degrees after TDC indicated at 360 crank angle degrees. However, it should be appreciated that the intake valve may be opened at other times after TDC. In contrast, the intake valve during the un-enhanced vaporization mode is opened at approximately 400 crank angle degrees or approximately 40 crank angle degrees after TDC. It should be appreciated that these examples have been provided for an example four stroke engine utilizing a 720 crank angle degrees cycle. However, the approaches described herein may be applied to cycles utilizing fewer or greater numbers of strokes or utilizing cycles of different crank angle durations.

As illustrated by the comparison of the fuel boiling temperature achieved by each of the enhanced and un-enhanced vaporization modes after a cold start of the engine, the enhanced vaporization mode can be more effective at vaporizing fuel within the cylinder shortly after a cold start of the engine as compared to the un-enhanced vaporization mode. Thus, the control system can select to utilize the enhanced vaporization mode for a prescribed period of time or a prescribed number of cycles after start-up, or until one or more conditions are satisfied such as the attainment of prescribed temperature thresholds by various engine system components as described with reference to FIG. 2.

FIG. 4 is a graph showing a comparison of fuel evaporation rate within the example cylinder of the engine for the enhanced and un-enhanced vaporization modes shortly after a cold start of the engine. The graph of FIG. 4 shows crank angle represented along the horizontal axis and fuel budget represented along the vertical axis. Again, in this example, like FIG. 3, TDC of piston position occurs at 360. Thus, FIG. 4 shows a portion of an intake stroke of a four stroke engine having a cycle that is defined by a 720 crank angle degrees period.

The total fuel injected into the cylinder for the enhanced vaporization mode is indicated at 410. In this particular example, the start of injection of the fuel is initiated at approximately 450 crank angle degrees, which corresponds with the intake valve opening timing shown in FIG. 3. The vaporized portion of the total fuel within the cylinder indicated at 412 is shown increasing with time via increasing crank angle after initiation of the injection at 450 crank angle degrees. The liquid portion of the total fuel within the cylinder indicated at 414 is shown decreasing with time as the liquid fuel is vaporized after the fuel is introduced to the cylinder.

The total fuel injected into the cylinder for the un-enhanced vaporization mode is indicated at 420. In this particular example, the start of injection of the fuel is initiated at approximately 430 crank angle degrees, which is before the fuel injection is initiated during the enhanced vaporization mode. The vaporized portion of the total fuel within the cylinder indicated at 422 is also shown increasing with time via increasing crank angle after initiation of the injection at 430 crank angle degrees. The liquid portion of the total fuel within the cylinder indicated at 424 is also shown decreasing with time as the liquid fuel is vaporized after the fuel is introduced to the cylinder.

FIG. 4 shows how the un-enhanced vaporization mode would utilize approximately 0.142 g of injected fuel after a cold start to make the mixture to be rich enough at the spark plug to be ignitable. Yet, there is still 0.105 g of fuel in liquid phase that did not evaporate. By contrast, through the use of the enhanced vaporization mode with greater negative valve overlap, an ignitable mixture at the spark plug can be achieved with only 0.052 g of fuel and there is substantially less liquid fuel left in the combustion chamber as it is evaporated. In this way, the total fuel injected by the enhanced vaporization mode can be substantially less than the total fuel injected by the un-enhanced vaporization mode after a cold start of the engine (e.g. before the engine has reached a warmed-up state) or where the fuel system pressure has not yet attained its full operating pressure.

FIG. 5 is a graph showing the effects of varying the start of injection on fuel evaporation rate during the enhanced vaporization mode. In particular, FIG. 5 shows how the start of injection (SOI) can be varied for a given intake valve opening timing to provide different resulting proportions of vaporized fuel and liquid fuel. Crank angle is again represented along the horizontal axis as in FIGS. 3 and 4, and evaporation rate of the fuel is represented along the vertical axis. In this example, the total fuel mass, the fuel vapor mass and the airborne liquid fuel mass are all normalized, for ease of comparison, by the injected fuel amount for each of the different SOI timings is normalized for ease of comparison. For example, the total fuel injected at 430 crank angle degrees as indicated at 510, the total fuel injected at 450 crank angle degrees as indicated at 520, and the total fuel injected at 470 crank angle degrees as indicated at 530 are normalized by the injected fuel amount and 100% means that all fuel was injected. As described with reference to FIG. 2, the control system can vary the relative timing of the intake valve opening and initiation of the fuel injection to vary the rate of vaporization of the fuel.

In this example, the injection timing of 450 crank angle degrees exhibits the greatest portion of vaporized fuel indicated at 522 as compared to the vaporized fuel portion for the injection timings of 430 crank angle degrees indicated at 512 and 470 crank angle degrees indicated at 532. Conversely, the injection timing of 450 crank angle degrees exhibits the lowest portion of liquid fuel (i.e. fuel that has not vaporized) indicated at 524 as compared to the liquid fuel portion for the injection timings 430 crank angle degrees indicated at 514 and 470 crank angle degrees indicated at 534. Thus, for each of these example injection timings, an injection timing of 450 crank angle degrees corresponding to the intake valve opening timing can achieve a specified mass of vaporized fuel with the smallest fuel injection amount due to favorable in-cylinder conditions.

One potential cause of these results occurs from coincident valve opening, which is temporally closest to the fuel injection at 450 crank angle degrees. It can be seen that the fastest evaporation rate, 80% of the injected fuel, is achieved if the fuel is injected at intake valve opening. Injecting 20 degrees before intake valve opening results in only 28% of fuel vaporized and injecting 20 degrees after IVO results in 38% of fuel vaporized. Thus, as one example, optimum conditions for fuel evaporation can be achieved if start of injection is performed at intake valve opening. However, vaporization can also be improved by initiating the fuel injection within 30 crank angle degrees after the intake valve opening as demonstrated by the example injection at 470 degrees.

The influx of intake air that occurs upon opening of the intake valve can increase mixing within the cylinder due to the high air inflow velocity as compared to injecting before or after the valve has opened, thereby further promoting fuel vaporization. Therefore, not only can the reduction of cylinder pressure provide increased vaporization of the fuel by reducing the boiling temperature, but can also increase the rate at which the intake air is entrained into the cylinder after the intake valve is opened, thereby further increasing the vaporization rate via air and fuel mixing. In this way, the control system can vary the relative timing of the intake valve opening and the start of injection of fuel to obtain a specified mass of vaporized fuel with the smallest or reduced amount of fuel injection quantity.

Figure 6:
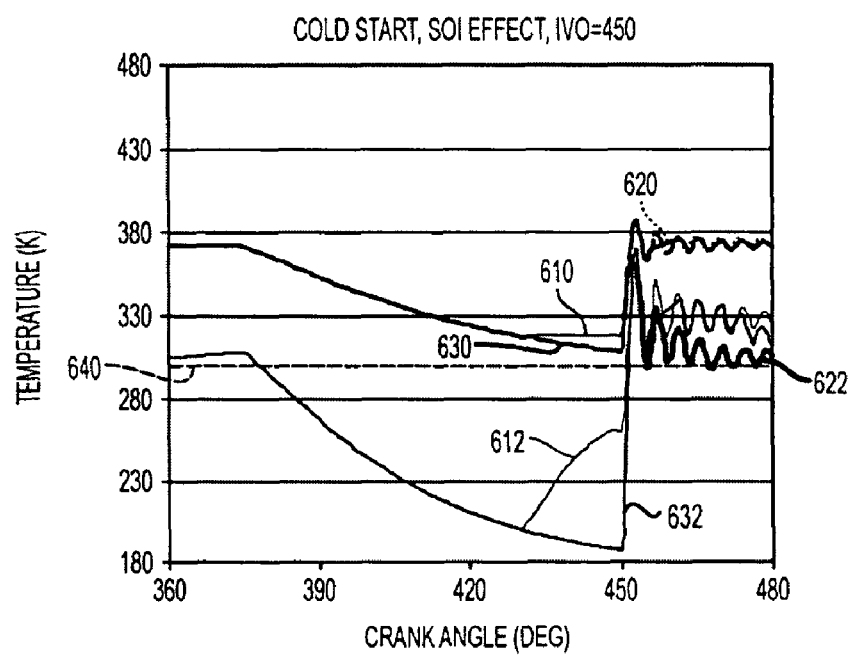
FIG. 6 is a graph showing an effect of varying the start of injection on in-cylinder temperature and fuel boiling temperature.

FIG. 6 is a graph showing the effects of varying the start of injection on in-cylinder temperature and fuel boiling temperature. The example injection timings illustrated in FIG. 6 are the same as those described in FIG. 5. The fuel boiling temperature for a SOI of 430 crank angle degrees is indicated at 610, the fuel boiling temperature for a SOI of 450 crank angle degrees is indicated at 620, and the fuel boiling temperature for a SOI of 470 crank angle degrees is indicated at 630. Further, the temperature of the fuel and air mixture within the cylinder for the SOI of 430 crank angle degrees is indicated at 612, the SOI of 450 crank angle degrees is indicated at 622, and the SOI of 470 crank angle degrees is indicated at 632. In this example, the intake valve is again opened at 450 crank angle degrees as was described with reference to FIG. 5. The fuel temperature in this example is 300 K as indicated at 640.

As shown in FIG. 6, the fuel that is injected at a SOI of 430 crank angle degrees, which is 20 crank angle degrees before intake valve opening, has a relatively colder in-cylinder temperature. Even though the difference between the fuel temperature and the fuel boiling temperature is small, the fuel is slow at extracting heat from the charge to evaporate, but instead provides heat to the cooler air charge, which leads to a low fuel evaporation rate. Thus, the SOI of 430 crank angle degrees that is provided 20 crank angle degrees before intake valve opening has the slowest evaporation rate of the three examples provided. This lower evaporation rate can lead to high surface fuel wetting, for example, of the cylinder walls and piston face. In this way, the enhanced vaporization mode can be used to achieve a more uniform mixture and distribution of air and fuel within the combustion chamber compared to a more stratified distribution that may otherwise be obtained. The improved mixing and reduction of fuel buildup on the combustion chamber walls and piston surfaces can also reduce exhaust gas emissions.

FIGS. 7A-7D provide example timing diagrams illustrating how a cylinder of the engine may be controlled during the enhanced vaporization mode described herein. In each of the example timing diagrams, the horizontal axis represents crank angle for an example four stroke engine having a cycle period of 720 crank angle degrees. The power stroke corresponds to the period between 0 (or 720) and 180 crank angle degrees, whereby the piston is traveling from TDC toward bottom dead center (BDC). The exhaust stroke corresponds to the period between 180 and 360 crank angle degrees, whereby the piston is traveling from BDC toward TDC. The intake stroke corresponds to the period between 360 and 540 crank angle degrees, whereby the piston is traveling from TDC toward BDC. The compression stroke corresponds to the period between 540 and 720 crank angle degrees, whereby the piston is traveling from BDC to TDC. Events such as exhaust valve opening, intake valve opening, fuel injection, and ignition timing are provided.

FIG. 7A shows an example where the exhaust valve is operated at 710 and is closed at a timing that is a similar timing relative to TDC as the opening of the intake valve as indicated at 720. Thus, in this particular example, the pressure in the cylinder at 450 crank angle degrees when the fuel is injected at 730 may be similar to the intake manifold pressure as the piston has returned to a similar position at the intake valve opening event as compared to the exhaust valve closing event. In contrast, as shown in FIG. 7B, by closing the exhaust valve at a timing that is closer to TDC as indicated at 750 than the opening of the intake valve as indicated at 720, the pressure in the cylinder may be further reduced to below the pressure within the intake manifold. For example, in the example of FIG. 7B, the intake valve is opened at substantially the same timing (450 crank angle degrees) that the fuel injection is initiated. Thus, in the example of FIG. 7B, the reduction of in-cylinder pressure at the time the injection is initiated and the intake valve is opened can further increase fuel vaporization due to the reduction of boiling temperature of the fuel and the increased mixing of the air and fuel due to the increased flow rate of air into the combustion chamber.

FIGS. 7A and 7B show examples where the intake valve opening and start of injection occur at approximately 450 degrees or approximately 90 degrees after TDC. FIG. 7C by contrast shows an example where the intake valve opening is advanced and the fuel injection is performed after intake valve opening. Thus, as one example, the intake valve can be opened at a timing that is at least 60 crank angle degrees after TDC.

FIG. 7D shows an example where the intake valve opening and the start of injection are performed before 120 degrees after TDC. Thus, as demonstrated by the examples of FIGS. 7A-7D, it should be appreciated that the control system can advance or retard the intake valve opening and start of injection so that they occur at a prescribed timing that facilitates fuel vaporization. This timing may be varied to vary the fuel vaporization rate as described with reference to FIG. 2.

In each of the examples shown in FIGS. 7A-7D, the start of injection and opening of the intake valve are performed at substantially the same time or the injection is initiated after the opening of the intake valve to take advantage of the increased rate of fuel vaporization. However, the approaches shown in the examples of FIGS. 7B-7D can provide even greater fuel vaporization rates since the in-cylinder pressure can be reduced to below that of the intake manifold pressure before opening of the intake valve by asymmetric activation of the intake and exhaust valves about TDC. In each of the examples, mixture of air and fuel can be ignited as indicated at 740 at an optimal crank angle chosen to be best for the combustion system investigated. As one example, an ignition spark may be performed by a spark plug to initiate combustion of the air and fuel mixture.

Figure 8A:
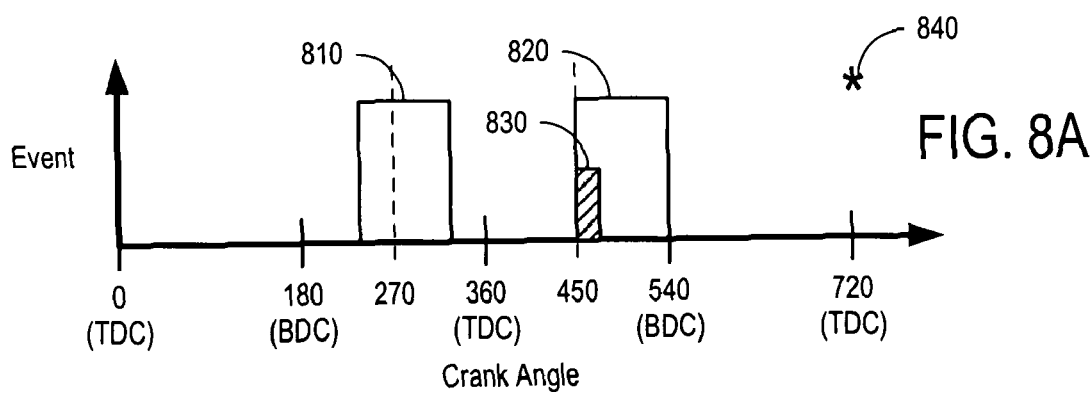
FIGS. 8A-8C are timing diagrams showing additional engine control examples.
Figure 8B:
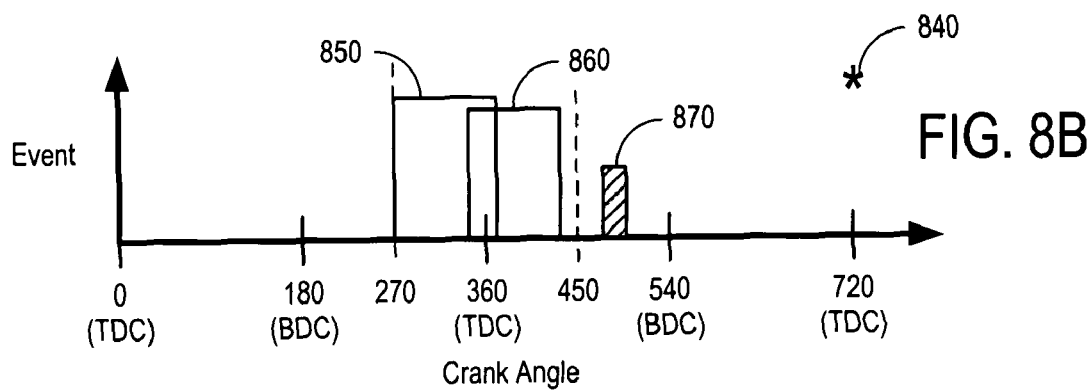
Figure 8C:
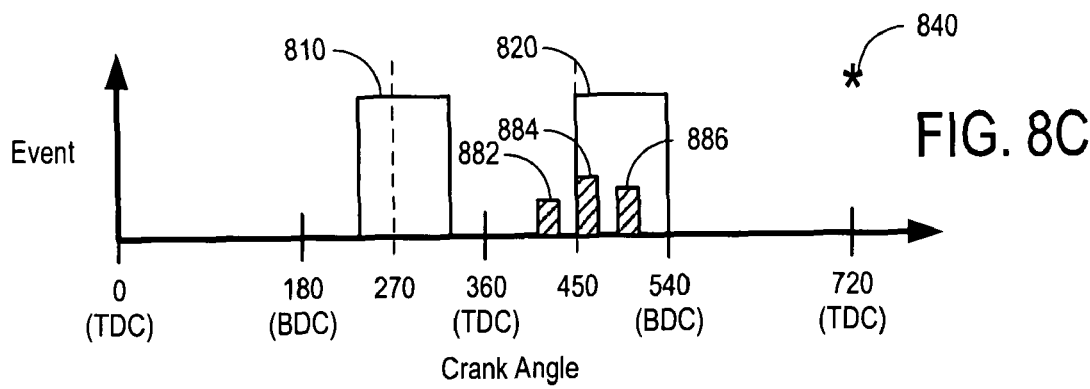

FIGS. 8A-8C provide additional examples utilizing timing diagrams that are similar to those of FIGS. 7A-7D. FIG. 8A shows how fuel may be injected after the intake valve is opened during the enhanced vaporization mode to achieve at least some of the benefits of the increased vaporization rate. For example, the exhaust and intake valves can be operated at 810 and 820, respectively, with negative valve overlap. The fuel injection can be performed as indicated at 830 after the intake valve is opened. For example, the fuel injection can be performed between 0 and 30 degrees after the intake valve is opened as described with reference to the 470 crank angle degree injection of FIGS. 5 and 6.

FIG. 8B shows how the un-enhanced vaporization mode can be performed and further serves as a comparison against at least the examples shown in FIGS. 7A-7B of the enhanced vaporization mode. For example, the exhaust valve and intake valves may be operated with positive overlap as indicated at 850 and 860 respectively, whereby the intake valve is opened before the exhaust valve is closed. Furthermore, the fuel injection timing can be different than for the enhanced vaporization mode as shown in FIG. 7B, for example. Finally, the fuel and air mixture can be ignited at 840, whereby the cycle may be repeated.

FIG. 8C shows how multiple fuel injections can be performed during the enhanced vaporization mode. For example, FIG. 8B shows an example similar to FIG. 7B, whereby two or more of injections 882, 884, and 886 may be performed. As one example, a first injection 882 may be performed before the intake valve is opened and a second injection 884 may be performed at approximately the same time as the intake valve opening. As another example, a first injection 884 may be performed at approximately the same time as the intake valve is opened and a second injection may be performed at 886 after the intake valve has opened. Thus, two or more fuel injections can be used to provide the total fuel to the cylinder.

Thus, the FIGS. 7A-7D and FIGS. 8A-8C provide examples of how the amount of valve overlap, relative valve timings, in-cylinder pressures, and fuel injection timings, number of injections, and fuel amounts can be varied based on operating conditions to achieve sufficient fuel vaporization during low fuel system pressure conditions or lower engine temperature conditions. As described herein, these conditions may include fuel composition, fuel temperature, engine temperature, fuel system pressure, etc. For example, the amount of negative overlap, the relative timings of exhaust valve closing and intake valve opening, the fuel injection timing, the number of fuel injections, and/or the duration and extent of the enhanced vaporization mode can be varied responsive to the composition of the fuel (e.g. the proportion of alcohol and gasoline in the fuel).

As demonstrated by some of the above examples, the valve opening timing and/or initiation of the fuel injection during the enhanced vaporization mode can be performed within a range of 60 crank angle degrees and 120 crank angle degrees after TDC and the exhaust valve can be closed before TDC. As another example, the valve opening timing and/or initiation of fuel injection can be performed within a range of 80 crank angle degrees and 100 crank angle degrees after the TDC. As yet another example, the intake valve opening can be performed at approximately 90 crank angle degrees after TDC and the fuel injection can be initiated within 30 crank angle degrees after the intake valve opening.

Figure 9:
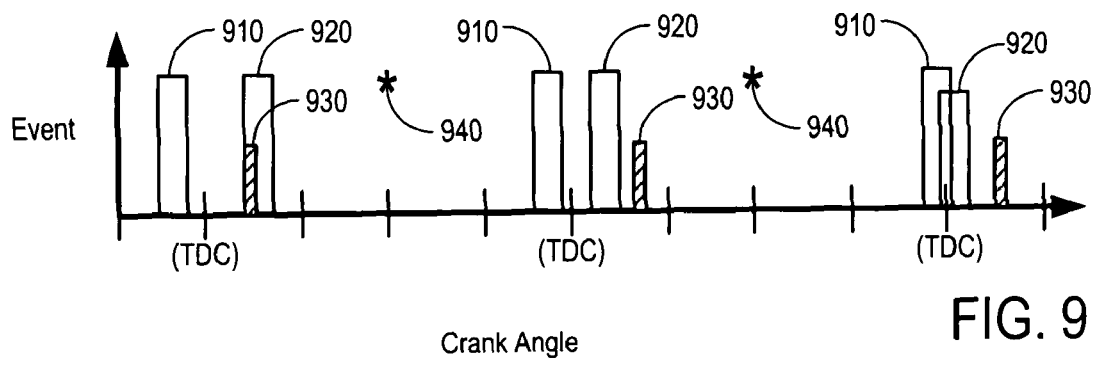
FIG. 9 is a timing diagram illustrating how the engine can be transitioned between different fuel vaporization modes.

FIG. 9 shows a timing diagram for multiple cycles of an example cylinder that is transitioned from the enhanced vaporization mode to the un-enhanced vaporization mode as the engine becomes warmed-up after a cold start or as the fuel system pressure increases after start-up. As shown for the first cycle located on the left side of the timing diagram, the enhanced vaporization mode is performed, whereby the exhaust valve and intake valve are operated with negative valve overlap as indicated at 910 and 920, respectively. The fuel injection is initiated at substantially the same time as the intake valve is opened to increase fuel vaporization. Finally, the air and fuel mixture is ignited as indicated at 940.

During a later cycle, indicated by the next set of events on the timeline, the negative overlap between the exhaust valve and intake valve openings can be reduced, the asymmetry about TDC between the exhaust valve closing and intake valve opening can be reduced, and/or the fuel injection timing can be advanced or retarded from the previous cycles as the engine is transitioned to the un-enhanced vaporization mode. The exhaust valve or intake valve timings may be adjusted by utilizing a VCT approach, whereby the position of the cam relative to the crankshaft is varied and/or by utilizing cam profile switching to obtain different valve timings and/or lifts or by utilizing electromagnetic valve actuation (EVA).

During the last cycle shown in FIG. 9 on the right side of the timeline, the intake and exhaust valves can be operated with positive overlap and/or the fuel injection can be further advanced or retarded from previous cycles as the engine attains its warmed-up state. In this way, the engine can be transitioned from the enhanced vaporization mode to the un-enhanced vaporization mode as the engine is warmed-up after a cold start. Note that in some examples, such as after a warm start of the engine, the engine may be operated in the un-enhanced vaporization mode without first transitioning through the enhanced vaporization mode.

It should be appreciated that the control system can transition the engine between the different vaporization modes based on the operating conditions of the engine. For example, the transition may be performed based on system temperature, fuel system pressure, and/or composition of the fuel, among other operating conditions described herein. For example, the enhanced fuel vaporization mode may be utilized for a longer period of time or a greater number of cycles after start-up of the engine for fuels containing a higher concentration of alcohol.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, V-8, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. In a cylinder of a directly injected internal combustion engine, a method comprising:
    closing an exhaust valve of a cylinder of the engine;
    opening an intake valve of the cylinder after the exhaust valve of the cylinder has closed;
    expanding a volume of the cylinder at least until a pressure within the cylinder is reduced to below an intake manifold pressure by moving a piston of the cylinder away from top dead center for at least a portion of between the closing of the exhaust valve and the opening of the intake valve; and
    initiating an injection of fuel directly into the cylinder via an in-cylinder injector after the exhaust valve has closed, wherein the engine is a four stroke engine and wherein the fuel includes a mixture of gasoline and an alcohol, the method further comprising adjusting at least an intake and/or exhaust valve timing responsive to an amount of the alcohol in the fuel.

2. The method of claim 1, wherein the fuel injection is initiated at substantially the same timing as the intake valve opens.

3. The method of claim 1, wherein the fuel injection is initiated after the intake valve is opened.

4. The method of claim 3, wherein the fuel injection is initiated within 30 crank angle degrees after the intake valve is opened.

5. The method of claim 1, wherein the exhaust valve is closed at a first timing relative to before top dead center and the intake valve is opened at a second timing relative to after top dead center, wherein the second timing is greater than the first timing, and where the fuel includes an alcohol to vary an amount by which the pressure is below the intake manifold pressure.

6. The method of claim 5, wherein the second timing is within a range of 60 crank angle degrees and 120 crank angle degrees after top dead center and wherein the exhaust valve is closed before the piston is moved away from top dead center.

7. The method of claim 5, wherein the second timing is within a range of 80 crank angle degrees and 100 crank angle degrees after top dead center.

8. The method of claim 5, wherein the second timing occurs at approximately 90 crank angle degrees after top dead center and wherein the fuel injection is initiated at approximately 90 crank angle degrees after top dead center or within 30 crank angle degrees after the intake valve opening.

9. The method of claim 1 further comprising, initiating a plurality of injections of fuel directly into the cylinder via the in-cylinder injector after the exhaust valve has closed, wherein a first injection is initiated before the intake valve is opened and a second injection is initiated at substantially the same time as the intake valve is opened or after the intake valve is opened.

10. An engine system, comprising:
an internal combustion engine including at least one cylinder defined by cylinder walls and a piston moveably disposed within the cylinder;
an air intake manifold fluidly coupled with the cylinder;
an intake valve arranged between the intake manifold and the cylinder;
an exhaust valve arranged between the cylinder and an exhaust passage of the engine;
a direct in-cylinder fuel injector configured to deliver fuel directly to the cylinder; and
a control system configured to, during at least one condition, operate the engine so that the piston moves between a top dead center position providing the smallest cylinder volume and a bottom dead center position providing the greatest cylinder volume to reduce a pressure within the cylinder to below a pressure within the intake manifold, and operate the exhaust valve to close at a first timing relative to the piston attaining the top dead center position and operate the intake valve to open at a second timing relative to the top dead center position after the exhaust valve has closed and operate the fuel injector to initiate a fuel injection directly into the cylinder at the same timing as the intake valve opening or after the intake valve opening, wherein a first number of cycles is varied responsive to a composition of the fuel.

11. The system of claim 10, wherein the first timing is less than the second timing.

12. The system of claim 11, wherein the exhaust valve is closed before the piston attains the top dead center position and wherein the intake valve is opened after the piston attains the top dead center position.

13. The system of claim 12, wherein the intake valve is opened within a range of 80 crank angle degrees and 100 crank angle degrees after the top dead center position and wherein the fuel injection is initiated within 20 crank angle degrees of the intake valve opening.

14. The system of claim 10, wherein the condition includes the first number of cycles after a start of the engine and wherein the control system is further configured to, after the first number of cycles after the start of the engine, advance the timing of the intake valve opening and retard the timing of the exhaust valve closing so that the intake valve opens before the exhaust valve is closed.

15. A method of operating an internal combustion engine, comprising:
during a first condition, operating the engine with negative overlap between at least one intake valve and at least one exhaust valve, moving a piston of a combustion chamber away from top dead center to expand a volume of a cylinder and reduce a pressure within the cylinder to below an intake manifold pressure before opening the intake valve, and injecting fuel directly into the combustion chamber of the engine at the same time or after the intake valve has opened; and
during a second condition, operate the engine with positive overlap between the intake valve and the exhaust valve and directly injecting fuel into the combustion chamber, wherein the first condition is where the fuel includes a first fuel composition and the second condition is where the fuel includes a second fuel composition, wherein the first fuel composition includes a greater concentration of alcohol than the second fuel composition.

16. The method of claim 15, wherein the first condition is during a first period after a start of the engine and the second condition is during a second period after the first period.

17. The method of claim 15, wherein the first condition is during a cooler engine temperature and the second condition is during a warmer engine temperature.

18. The method of claim 15 further comprising, transitioning the engine between the first condition and the second condition with an increasing fuel pressure by varying an operating parameter of a cam actuator of at least one of the intake valve and the exhaust valve.

19. A method for an engine cylinder, comprising:
during a cold start, operating the cylinder with asymmetric negative valve overlap between intake and exhaust valves to generate a reduced cylinder pressure; and
initiating direct liquid fuel injection of a gasoline-alcohol mixture into the cylinder with intake valve opening and while cylinder pressure is less than intake manifold pressure, where intake valve timing opening delay is adjusted responsive to an alcohol amount in the fuel.

20. The method of claim 19 wherein the exhaust valve is closed at a first timing relative to before top dead center and the intake valve is opened at a second timing relative to after top dead center, wherein the second timing is greater than the first timing, to vary an amount by which the cylinder pressure is below the intake manifold pressure.

* * * * *